United States Patent [19]

Kolm et al.

[11] 4,387,318

[45] Jun. 7, 1983

[54] PIEZOELECTRIC FLUID-ELECTRIC GENERATOR

[75] Inventors: Eric A. Kolm, Brookline; Henry H. Kolm, Wayland, both of Mass.

[73] Assignee: Piezo Electric Products, Inc., Cambridge, Mass.

[21] Appl. No.: 270,370

[22] Filed: Jun. 4, 1981

[51] Int. Cl.³ ............................................. H04R 17/00
[52] U.S. Cl. .................................... 310/330; 310/331; 310/339
[58] Field of Search ............... 310/328, 329, 330, 331, 310/332, 339

[56] References Cited

U.S. PATENT DOCUMENTS

| 3,457,463 | 7/1969 | Balamuth | 310/330 X |
| 3,500,451 | 3/1970 | Yando | 310/330 |
| 3,519,009 | 7/1970 | Rubin | 310/332 |
| 3,801,839 | 4/1974 | Yo | 310/328 X |

Primary Examiner—William M. Shoop
Assistant Examiner—Peter S. Wong
Attorney, Agent, or Firm—Joseph S. Iandiorio

[57] ABSTRACT

A piezoelectric fluid-electric generator including: a piezoelectric bending element; means for mounting one end of the bending element in a fluid stream; means for driving the piezoelectric bending element to oscillate with the energy of the fluid stream; and electrode means connected to the piezoelectric bending element to conduct current generated by the oscillatory motion of the piezoelectric bending element.

27 Claims, 10 Drawing Figures

PIEZOELECTRIC FLUID-ELECTRIC GENERATOR

FIELD OF INVENTION

This invention relates to a piezoelectric fluid-electric generator, and more particularly to such a generator which includes means for driving a piezoelectric bending element to oscillate with the energy of the fluid stream.

BACKGROUND OF INVENTION

Conventional rotary windmills have been used for hundreds of years to generate mechanical work from wind energy and more recently to generate electric power from wind energy. Rotary windmills have a number of disadvantages. The blades are generally, large, expensive and require a tower or mast of substantial height for blade ground clearance. Such units must be very large to be efficient and economically viable, and require professional supervision and considerable maintenance. They will not generate at wind speeds below about 20 mph, and must be feathered to avoid destruction at wind speeds above about 45 mph. The rotary converters which transform wind energy to electric power are relatively expensive, low efficiency and subject to wear. Only a relatively small cross-section area of the wind on the blades is actually useful for driving the blades.

SUMMARY OF INVENTION

It is therefore an object of this invention to provide an improved, simple and virtually wear-free electric power generator for converting fluid energy to electric power.

It is a further object of this invention to provide such a generator which is relatively inexpensive and requires a minimum of moving parts.

It is a further object of this invention to provide such a generator which can be built in small unit size, and which will operate at virtually any wind or fluid velocity without requiring expert supervision or any particular adjustment.

It is a further object of this invention to provide such a generator which converts fluid flow energy directly to electric power.

It is a further object of this invention to provide a piezoelectric fluid-electric generator for converting fluid-flow energy, either liquid or gas, e.g. air or water, to electric power, and which can be driven by a stream which is too small for driving any rotary type of generator.

The invention results from the realization that oscillation of a piezoelectric bending element can be induced by using the elastic restoring force of the piezoelectric bending element to respond to deforming forces applied by a fluid flow causing the piezoelectric bending element to flutter or oscillate and generate electric power.

This invention features a piezoelectric fluid-electric generator including a piezoelectric bending element and means for mounting one end of the bending element in a fluid stream. There are means for driving the piezoelectric bending element to oscillate with the energy of the fluid stream. Electrode means connected to the piezoelectric bending element conduct current generated by the oscillatory motion of the piezoelectric bending element.

In one embodiment the piezoelectric fluid-electric generator is an elongate member. The means for driving may include a vane mounted to the free end of the piezoelectric bending element, and the vane may be an integral extension of the piezoelectric bending element. The means for driving alternately may include duct means for increasing the flow velocity of the fluid directed at the surface of the piezoelectric bending element to reduce the pressure in that region and draw the piezoelectric bending element toward the duct means. The generator may also include funnel means for focussing the fluid flow to the piezoelectric bending element. The fluid which drives the generator may be air, and the generator may function as a windmill, or the fluid may be liquid, such as water. In a preferred embodiment, a number of such generators are used, for example in a windmill configuration, to convert wind energy to electric power.

DISCLOSURE OF PREFERRED EMBODIMENT

Other objects, features and advantages will occur from the following description of a preferred embodiment and the accompanying drawings, in which.

The invention may be accomplished by a piezoelectric fluid-electric generator which produces oscillation in a piezoelectric bending element to generate electric power from fluid power. For example, aerodynamic oscillation may be produced from wind power, and a group of piezoelectric fluid-electric generators may be used to function as a windmill. Other fluids, for example water, may be used also. Disclosed herein is a flutter vane type of piezoelectric fluid-electric generator, in which an enlarged vane may be positioned at the free end of a piezoelectric bending element to improve the aerodynamic oscillation in the windstream as the air stream flows along the vane. Alternatively, a reed-type piezoelectric fluid-electric generator is disclosed associated with a duct which directs the airstream directly at the bending element and which restricts the flow of the air stream and locally increases the velocity to create a suction, according to Bernoulli's Principle, on one side of the piezoelectric bending element until the elastic restoring force of the bending element overcomes the suction and causes the reed to bend in the opposite direction. In the flutter vane type of generator, an enlarged vane added to the free end of the piezoelectric bending element may be a separate material fastened or bonded to the piezoelectric bending element, or it may be an integral continuation of the piezoelectric bending element enlarged to provide the extra surface area to improve the fluttering action.

Figures 1, 2:
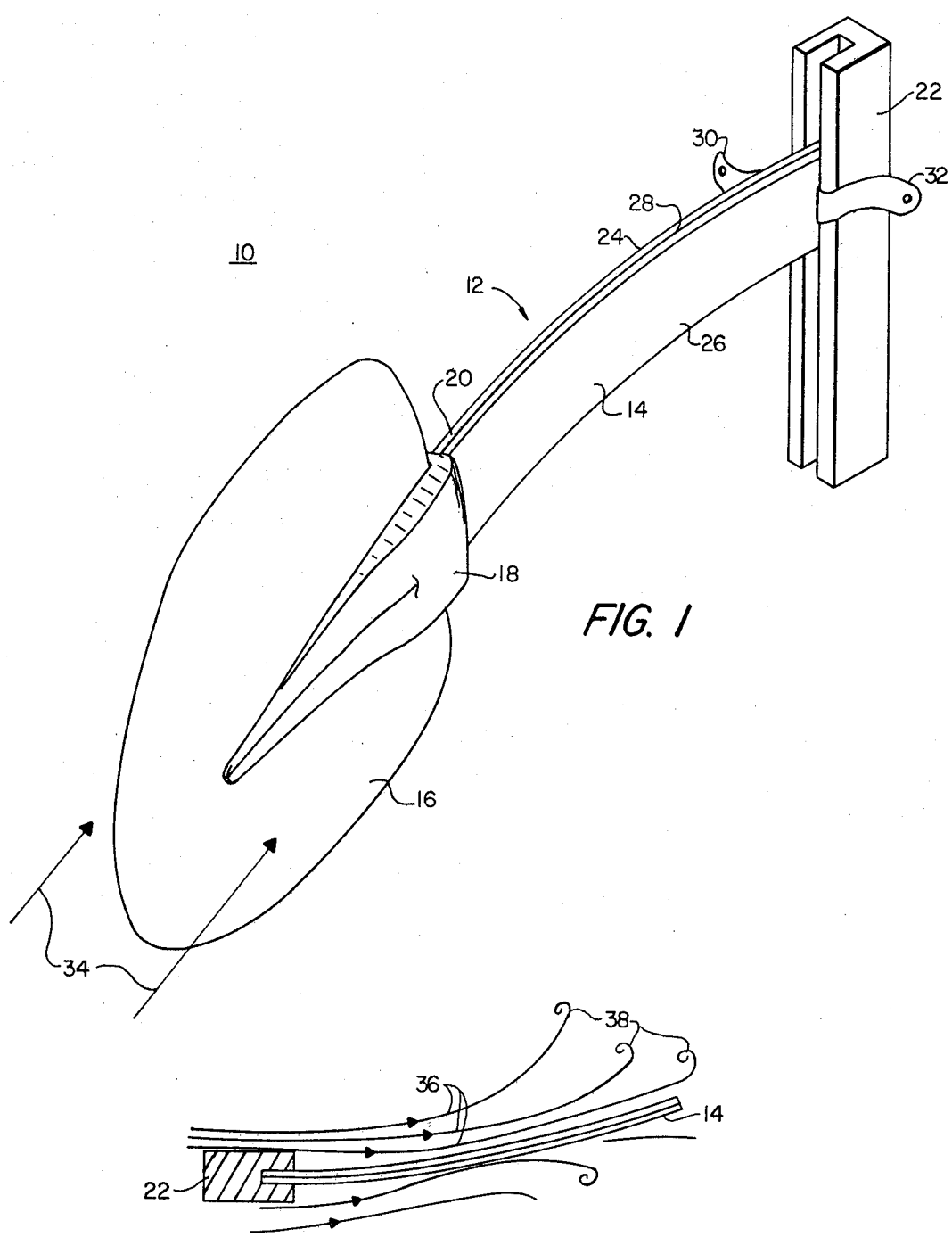
FIG. 1 is an axonometric view of a piezoelectric fluid-electric flutter vane generator according to this invention.
FIG. 2 is a schematic view showing the streamlines of fluid flow about the fluid-electric flutter vane generator of FIG. 1.

There is shown in FIG. 1 a piezoelectric fluid-electric generator 10 of the flutter vane type 12, including a piezoelectric bending element 14 and a vane 16 held by U-shaped member 18, fastened to the free end 20 of element 14. The other end of element 14 is held in a support in a mounting device, channel 22. Element 14 includes two piezoelectric portions 24, with an elastic sheet metal member 28 between them. Electrodes 30, 32 are attached to the piezoelectric members 24, 26, respectively. Air flows along vane 16 in the direction shown by arrows 34, as more clearly indicated in FIG. 2, where the stream lines 36 flowing over the fluttering element 14, shown here without vane 16, shed vortices 38 from the trailing edge of the element 14. The shedding vortices produce low pressure in that region, which sucks the vane to one side, as indicated in FIG. 2. When the elastic restoring force of element 14 exceeds the vortex suction and the vorticity dies out, element 14 starts to move in the opposite direction, where a vortex vacuum is beginning to build up due to curvature. This action continues so that the element 14 flutters back and forth, generating an alternating electric current which is conducted to a load through electrodes 30, 32. Vane 16 enhances the aerodynamic oscillation or flutter. Although throughout this disclosure reference is made to aerodynamic phenomenon and the use of air and wind to drive the piezoelectric fluid-electric generator, that is not a limitation of the invention, as any fluid in motion can be used, for example other gases and liquids, such as water.

Figure 3:
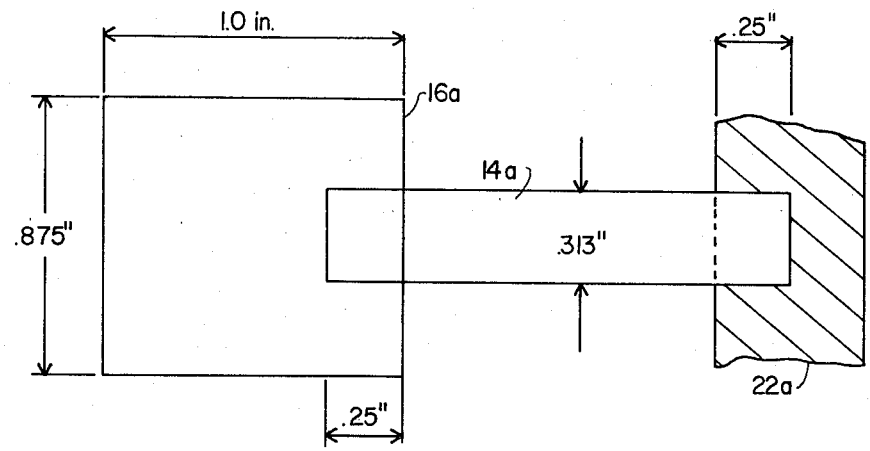
FIGS. 3 and 4 are a side elevational and top plan views, respectively, showing various dimensions of a specific flutter vane generator configuration according to this invention.
Figure 4:
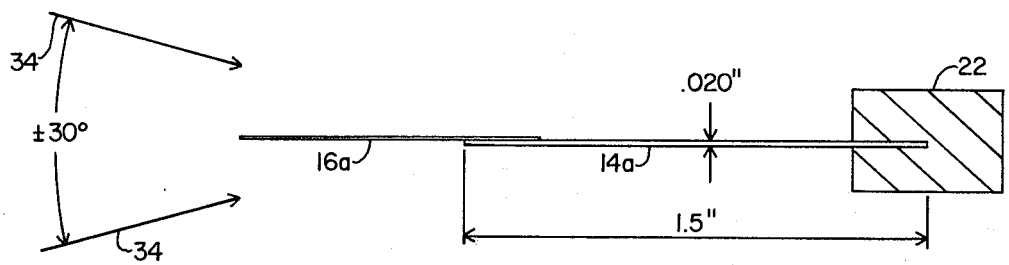
Figure 5:
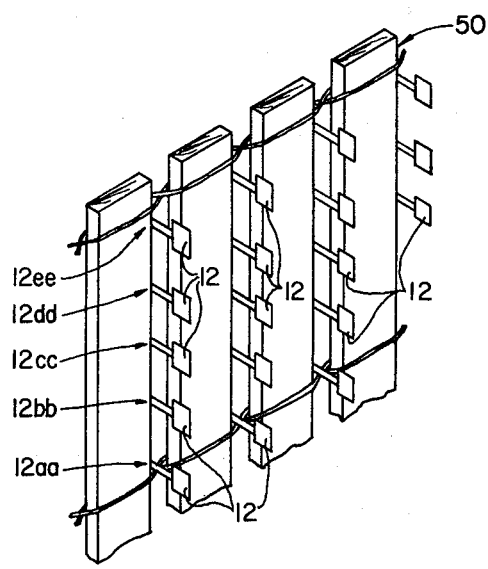
FIG. 5 is an axonometric view of a portion of a snow fence with flutter vane generators mounted thereon.

A typical flutter vane, FIG. 3, may include a 0.01 inch thick Mylar vane 16a, FIG. 3, which is one inch by 0.875 inch and is bonded with a ¼ inch overlap to the end of a 0.02 inch thick piezoelectric bending element 14a, which is 0.313 inches wide and 1½ inches long made of Gulton ceramic type G-1195 with an incidence angle of + or −30° as indicated in FIG. 4. A wind velocity of 25 miles an hour produces a peak-to-peak deflection of 0.125 inches at the tip and the bending element produces an electrical output of 0.833 milliwatts. A plurality of flutter vane 12 piezoelectric fluid-electric generators may be arranged, for example, on a common snow fence 50, FIG. 5, to function as a windmill for generation of electric power from wind energy. Different flutter vanes in this assembly may be tuned to respond optimally at different wind velocities, since the low cost of the units makes a considerable amount of such overlap possible. The total assembly will thus generate electricity at almost any wind velocity, rather than within only the narrow range of velocities at which rotary windmills can operate. For example, set 12aa, closest to the ground, is set to 9 miles per hour, the next higher set 12bb at 12 mph, and sets 12cc, 12dd and 12ee at 15 mph, 18 mph and 21 mph, respectively.

For example, with flutter vane 12 of FIGS. 3 and 4, increasing the area of vane 16a and decreasing the stiffness of element 14a enables it to operate at lower oscillation frequencies and thus lower wind speed, but then in high wind speed the amplitude of deflection must be limited by stops, for example, to prevent overdriving and possible damage at the higher wind speeds. Conversely, decreasing the area of vane 16a and increasing the stiffness of element 14a enables greater efficiency and greater output at higher wind speed but poor performance at lower wind speed.

Figure 6:
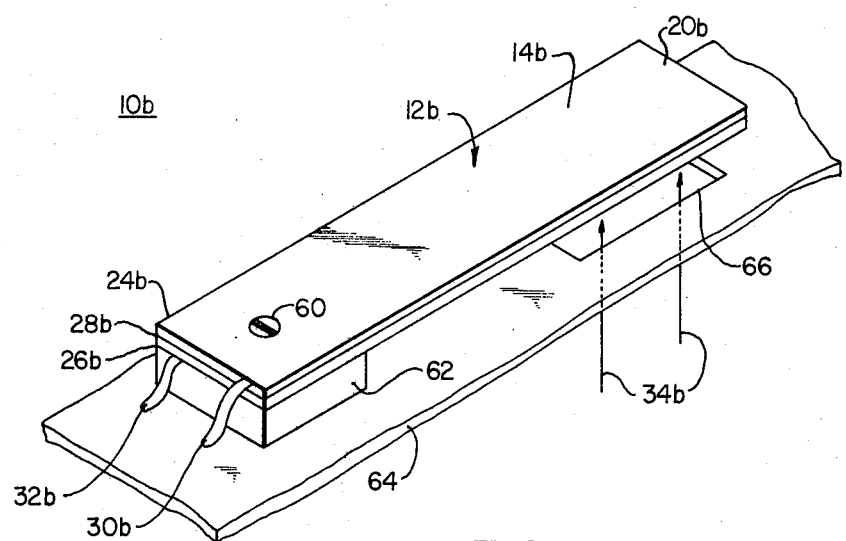
FIG. 6 is an axonometric view of an alternative type of piezoelectric fluid-electric reed generator according to this invention mounted over a fluid duct which directs the fluid directly at the piezoelectric bending element.

Alternatively, piezoelectric fluid-electric generator 10b, FIG. 6, may include a reed 12b generator, which includes a piezoelectric bending element 14b having one end fixed by screw 60 to mounting block 62 on plate 64, so that the free end 20b is positioned over duct or hole 66 in plate 64.

Figure 7:
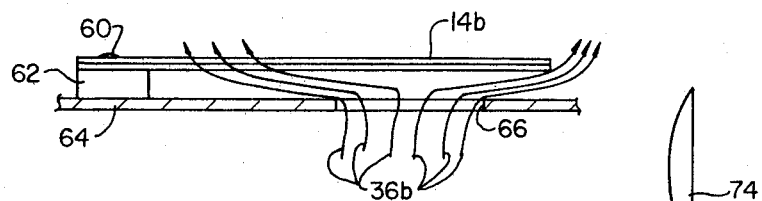
FIG. 7 is a schematic diagram showing the stream lines associated with fluid flow around the reed generator of FIG. 6.
Figure 8:
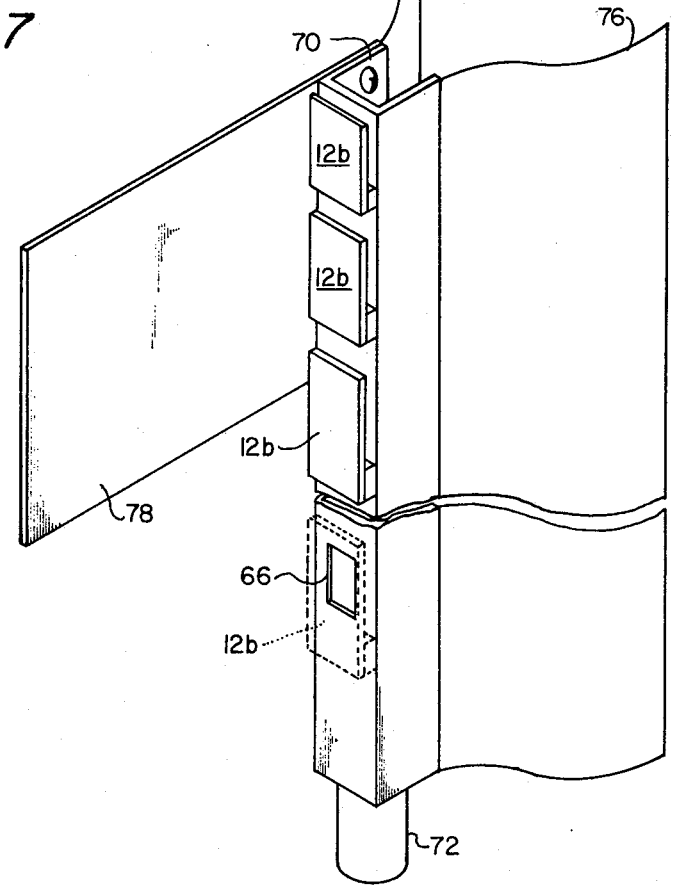
FIG. 8 is an axonometric view of a windmill having funneling surfaces to enhance the wind flow to a group of reed generators similar to those shown in FIG. 6.

Air flow 34b or other fluid flow directed against the surface of piezoelectric bending element 14b is shown in detail in FIG. 7, where stream lines 36b pass around the reed-type bending element 14b. The higher flow velocity of the air stream as it moves through hole or duct 66 and around bending element 14b produces a localized region of low pressure which, as explained by Bernoulli's Principle, sucks element 14b toward plate 64, thereby decreasing the flow. The suction force decreases until the elastic force of bending element 14b reverses the downward motion and allows the flow velocity of the air stream to once again increase as bending element 14 moves upward until once again the suction force overcomes the elastic force and then element 14b moves downward and the oscillation cycle repeats. A group of piezoelectric fluid-electric generator reeds 12b may be mounted on channel mast 70, FIG. 8, which is rotatably attached by a bearing not shown to mounting post 72 so that the funneling surfaces 74, 76 may be always rotated into the wind by the action of weathervane 78. Each of the generator reeds 12b is mounted, as shown in FIG. 6, with its free end 20b over a duct or hole 66, not visible in FIG. 8.

Figure 9:
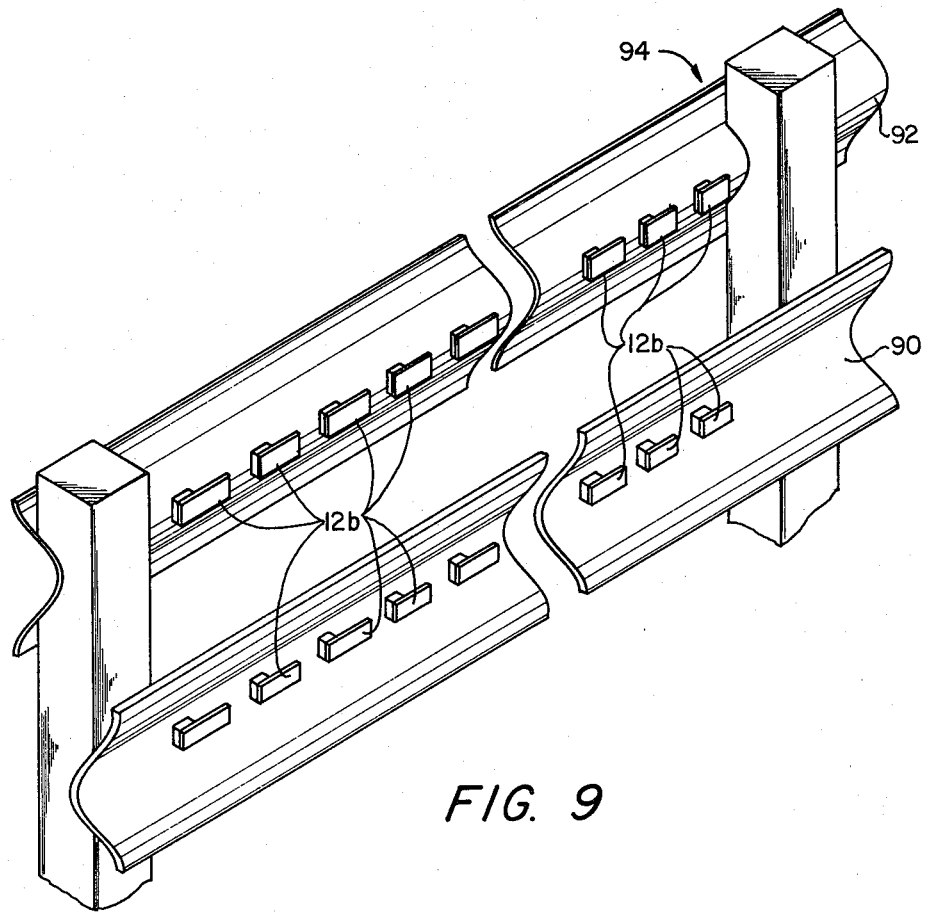
FIG. 9 is a portion of a rail fence containing a plurality of reed generators.
Figure 10:
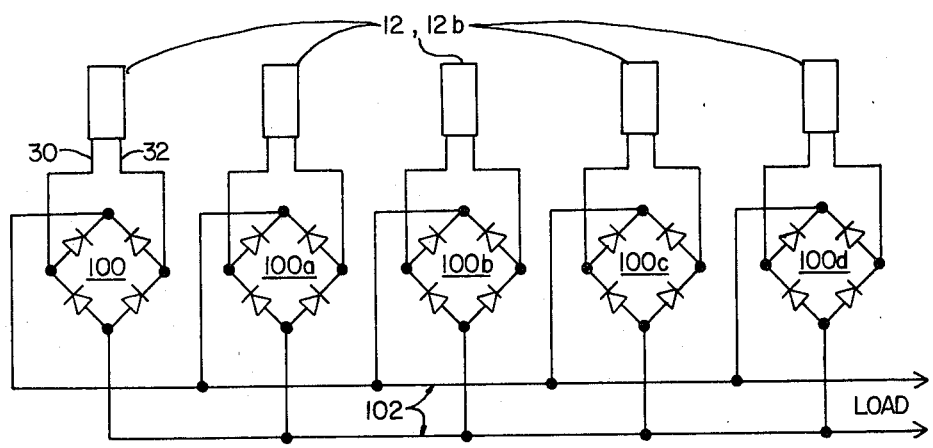
FIG. 10 is a schematic diagram of a plurality of piezoelectric fluid-electric generators according to this invention with their electrodes connected through diodes to a power bus.

Alternatively, a group of such generator reeds 12b may be mounted over similar holes or ducts on the rails 90, 92, of a common highway rail fence 94, as shown in FIG. 9, with their free ends mounted over ducts or holes not visible in FIG. 9. The piezoelectric fluid-electric generators 12b may be connected to full-wave rectifier diode bridge 100, whose DC output is then supplied on bus 102 to a load, FIG. 10.

Other embodiments will occur to those skilled in the art and are within the following claims:

What is claimed is:

1. A piezoelectric fluid-electric generator comprising:

at least one piezoelectric bending element;

means for fixably mounting one end of each said piezoelectric bending element with the distal end of each said piezoelectric bending element disposed to oscillate in a fluid stream;

vane means attached to said distal end of each said piezoelectric bending element for driving each said piezoelectric bending element to oscillate with the energy of said fluid stream; and electrode means connected to each said piezoelectric bending element to conduct current generated by the oscillating motion of said piezoelectric bending element.

2. The piezoelectric fluid-electric generator of claim 1 in which each said piezoelectric bending element responds optimally to a predetermined fluid velocity.

3. The piezoelectric fluid-electric generator of claim 1 in which each said piezoelectric bending element is elongate in shape.

4. The piezoelectric fluid-electric generator of claim 1 in which said vane is an integral extension of each said piezoelectric bending element.

5. The piezoelectric fluid-electric generator of claim 1 in which said means for driving includes duct means for increasing flow velocity of the fluid directed at the surface of each said piezoelectric bending element to reduce the pressure in that region and draw said piezoelectric bending element toward said duct means.

6. The piezoelectric fluid-electric generator of claim 1 further including funnel means for focussing the fluid flow each to said piezoelectric bending element.

7. A piezoelectric fluid-electric generator comprising:
at least one piezoelectric bending element;
means for fixably mounting one end of each said piezoelectric bending element with the distal end of each said piezoelectric bending element disposed to oscillate in a fluid stream;
duct means for increasing flow velocity of the fluid directed at the surface of each said piezoelectric bending element to reduce the pressure in that region and draw each said piezoelectric bending element toward said duct means; and
electrode means connected to each said piezoelectric bending element to conduct current generated by the oscillating motion of each said piezoelectric bending element.

8. The piezoelectric fluid-electric generator of claim 7 in which each said piezoelectric bending element responds optimally to a predetermined fluid velocity.

9. The piezoelectric fluid-electric generator of claim 7 further including vane means for driving each of said piezoelectric bending elements to oscillate in said fluid stream.

10. The piezoelectric fluid-electric generator of claim 7 in which each said piezoelectric bending element is elongate in shape.

11. The piezoelectric fluid-electric generator of claim 7 in which each said vane is an integral extension of each said piezoelectric bending element.

12. The piezoelectric fluid-electric generator of claim 7 further including funnel means for focussing the fluid flow to each said piezoelectric bending element.

13. The piezoelectric fluid-electric generator of claim 7 in which the elastic restoring force of each said piezoelectric bending element increases proportionally as the degree of deformation is increased.

14. The piezoelectric fluid-electric generator of claim 13 in which said elastic restoring force of each said piezoelectric bending element eventually exceeds the deforming force as said degree of deformation is increased.

15. The piezoelectric fluid-electric generator of claim 14 in which each said piezoelectric bending element returns to its original position when said elastic restoring force exceeds said deformation force.

16. A piezoelectric windmill comprising:
a piezoelectric bending element;
means for fixably mounting one end of said piezoelectric bending element with the distal end of said piezoelectric bending element disposed to oscillate in an air stream;
vane means attached to said distal end of said piezoelectric bending element for driving said piezoelectric bending element to oscillate with the energy of said air stream; and
electrode means connected to said piezoelectric bending element to conduct current generated by the oscillating motion of said piezoelectric bending element.

17. The windmill of claim 16 in which each said piezoelectric element is elongate in shape.

18. The piezoelectric windmill of claim 16 further including duct means for increasing the flow velocity of the air stream directed at the surface of said piezoelectric bending element to reduce the pressure in that region and draw said piezoelectric bending element toward said duct means.

19. The piezoelectric windmill of claim 16 in which said vane is an integral extension of each said piezoelectric bending element.

20. The piezoelectric windmill of claim 16 further including funnel means for focussing the air flow to each said piezoelectric bending element.

21. A piezoelectric windmill comprising:
a plurality of piezoelectric bending elements;
means for fixably mounting one end of each of said piezoelectric bending elements with the distal end of each of said piezoelectric bending elements disposed to oscillate in an air stream;
vane means attached to said distal end of each of said piezoelectric bending elements for driving each of said piezoelectric bending elements to oscillate with the energy of said air stream; and
electrode means connected to each of said piezoelectric bending elements to conduct current generated by the oscillating motion of said piezoelectric bending elements.

22. The piezoelectric windmill of claim 21 further including duct means for increasing the flow velocity of the air directed at the surface of each of said piezoelectric bending elements to reduce the pressure in that region and draw each of said piezoelectric bending elements toward said duct means.

23. The piezoelectric windmill of claim 21 in which each said piezoelectric bending element is elongate in shape.

24. The piezoelectric windmill of claim 21 in which each said vane is an integral extension of each of said piezoelectric bending elements.

25. The piezoelectric windmill of claim 21 further including funnel means for focussing the air flow to each said piezoelectric bending element.

26. The piezoelectric windmill of claim 21 in which said plurality of piezoelectric bending elements includes at least two different groups, each set to respond optimally to a different air velocity.

27. A piezoelectric fluid-electric generator comprising:
a piezoelectric bending element;
means for fixably mounting one end of said piezoelectric bending element with the distal end of said piezoelectric bending element disposed to oscillate in a fluid stream;
vane means attached to said distal end of said piezoelectric bending element for driving said piezoelectric bending element to oscillate with the energy of said fluid stream; and
electrode means connected to said piezoelectric bending element to conduct current generated by the oscillatory motion of said piezoelectric bending element.

* * * * *